Patented Nov. 3, 1942

UNITED STATES PATENT OFFICE 2,300,599

TERPENE COMPOSITION

Donald H. Sheffield, Wilmington, Del., assignor to Hercules Powder Company, Wilmington, Del., a corporation of Delaware No Drawing. Original application October 3, 1939, Serial No. 292,673, now Patent No. 2,285,366, dated June 2, 1942. Divided and this application November 15, 1940, Serial No. 365,769

5 Claims. (Cl. 252—352)

This invention relates to a terpenic composition and more particularly it relates to a mixture of terpene alcohols and terpene ethers suitable for use as a surface active agent.

Terpene ethers have been prepared by the reaction of an alcohol with pinene, the reaction being catalyzed by a suitable acid. As usual in etherification reactions, the reaction has been carried out under anhydrous or substantially anhydrous conditions. Under these conditions, relatively low yields of useful product are obtained because of decomposition of the product, polymerization, formation of unstable acidic terpene compounds, and other side reactions causing loss and wastage of the pinene and difficulty in the recovery of the desired product. Certain ethers are so unstable under anhydrous acid conditions, the conditions heretofore known to produce ethers, as to be practically unobtainable, that is entirely unobtainable or obtainable only in very small yields.

It is an object to react pinene to a high yield of useful products. It is also an object to prepare terpene ethers and terpene alcohols simultaneously from pinene.

It is a further object to prepare a new improved surface active agent characterized by a low freezing point. It is a still further object to prepare such an agent further characterized by a very low or mild odor.

In accordance with this invention, I accomplish these objects by reacting pinene with a mixture of water and an alcohol in the presence of a suitable acidic catalyst whereby terpineol and a terpene ether are simultaneously formed. Usually an oily layer which contains the desired products is readily separated. Any catalyst remaining therein is removed or inactivated. Excess reactants may then be removed by distillation. The mixed product may then be fractionated into its components or, if desired, it may be used for some purposes without further treatment.

In the process according to this invention, the quantity of water present in the reaction is sufficient substantially to prevent the formation of decomposition products, polymerized products, and other undesired side reaction products which have no value and which interfere with the recovery of the desired product. Surprisingly, the water does not prevent the formation of the terpene ether, but actually prevents decomposition of the terpene ether by the catalyst. The result is a novel large yield of useful products from the pinene reacted upon, unobtainable by conducting reactions with water and an alcohol separately, with corresponding economy of production. Terpene ethers and terpineol are useful and valuable products. Furthermore, the relative quantities of terpene ether and terpineol produced may readily be varied over a wide range.

Conveniently, the pinene may be in the form of a turpentine. The turpentine may be either wood or gum turpentine of either the American or the French type. Of course, pure pinene may be used if desired but turpentine, which I define herein as a terpene fraction rich in pinene, is usually satisfactory. Both the alpha and beta form are included in the term pinene as used herein and in the claims.

The alcohol which may be employed as one of the reactants in the process of my invention may be a monohydric alcohol such as, for example, methyl, ethyl, propyl, isopropyl, butyl, isobutyl, betachloroethyl, chloropropyl, bromoethyl, bromopropyl, and so forth, or it may be a polyhydric alcohol, such as, for example, ethylene glycol, propylene glycol, trimethylene glycol, and so forth. It may be a substituted alcohol, provided, of course, that an alcoholic hydroxyl group is retained.

The reaction between the pinene or turpentine and the mixture of water and the alcohol is carried out with the aid of a suitable acid catalyst. I find the non-carboxylic polybasic acids and their acidic derivatives to be particularly suitable; for example, phosphoric acid, sulphuric acid, sodium acid sulphate, potassium acid sulphate, benzene sulphonic acid, toluene sulphonic acid, ethyl sulphonic acid, ethyl sulphuric acid, etc., are suitable catalysts. Other acids, such as the strong monobasic inorganic acids, may be used if desired, but they tend to induce lower yields, or to give products contaminated by difficultly removable by-products.

The temperature which I employ will depend upon the particular acid utilized as the catalyst and upon the quantity of catalyst used. With high concentrations of catalyst the reaction proceeds at low temperatures, and in fact, in such cases, the temperature must be kept low to prevent decomposition and rearrangements of the products. Higher temperatures are used with a low catalyst concentration. For example, sulphuric acid is desirably not employed in concentrations higher than 60% based on the mixture of acid and water present at a temperature of 0° C. nor is it desirably employed in concentrations lower than 2% on the same basis at a temperature of 70° C. However, when using sulphuric acid I prefer a concentration in the range of from 25% to 35% based on the mixture of acid and water present and preferably I carry out the reaction at a temperature in the range from 30° C. to 50° C.

The reaction conditions can be varied widely. Optimum conditions depend upon the catalyst utilized. For example, reaction at 40–50° C. in the presence of 37.5% phosphoric acid yields results comparable to those obtained by 10.5% sulphuric acid under similar conditions; likewise, 2% sulphuric acid gives results similar to 26-27% sodium acid sulphate. Conditions which may be used with sulphuric acid as the catalyst have been mentioned hereinbefore. However, if phosphoric acid is used as the catalyst, a concentration less than 75%, based on the mixture of water and acid present, is undesirable at 0° C., and a concentration less than 5% on the same basis is undesirable at 70° C. When using sodium acid sulphate, I prefer a concentration in the range of from about 20% to 30% at a temperature of from 50° C. to 70° C. When using benzene sulphonic acid, I prefer a concentration in the range of from 30% to 35% at a temperature in the range from 35° C. to 45° C.

In general I prefer to avoid high reaction temperatures since there is excessive loss by decomposition of the product to undesired materials such as monocyclic hydrocarbons. At low temperatures excessive formation of side reaction products, such as terpin hydrate, occurs and the desired reaction is too slow. It is, in general, undesirable to carry out the reaction at above about 70° C. or below about 0° C. I find a temperature in the range of from about 30° C. to about 50° C. to be preferable.

The ratio of the lower aliphatic alcohol to the water in the mixture which is reacted with the pinene will depend upon the ratio of terpene ether to terpineol desired in the product, and upon the particular alcohol utilized. The proportion of terpene ether in the product increases with the proportion of the alcohol in the reactant mixture. However, sufficient water should be present under the reaction conditions utilized to insure formation of both terpene alcohol and terpene ether and to prevent substantial decomposition of the terpene ether by the acid catalyst and to prevent the formation of undesirable acidic terpene compounds and other undesirable side reaction products. The minimum quantity of water will vary somewhat with the stability of the particular ether being synthesized, but in general the weight ratio of the alcohol to water should not exceed about 15 to 1. The proportion of the alcohol to the water in the reactant mixture may be varied in the ratio of from about 15:1 to about 1:5, preferably in the range from about 5:1 to about 1:1. The mixture of alcohol and water will be in excess of the quantity theoretically required to react with the pinene. An excess of about five times that theoretically required by the pinene available is suitable, although wide deviations from this quantity may be made.

In carrying out the reaction according to this invention, the turpentine or pinene, alcohol, water and catalyst are desirably agitated throughout the reaction. The reaction mixture is preferably cooled to maintain the temperature in the desired range so as to obtain the desired products since the reaction is exothermic. The reaction time will depend upon the kind and quantity of catalyst utilized, and upon the temperature at which reaction is maintained. It will usually be of the order of about 5 hours to about 8 hours when operating under the preferred conditions hereinbefore mentioned. However, it is undesirable to prolong the reaction beyond the time required to obtain a good yield since the desired products may react further with consequent loss of yield. Preferably the products are recovered promptly as soon as the reaction is substantially complete. After substantial completion of the reaction, two layers will usually form. The lower layer contains the excess water and most of the catalyst and excess alcohol. This lower layer may be drawn off and reused after adjustment of the reagents. The upper oily layer contains the terpinic products, some alcohol and a portion of the catalyst. This oily layer is neutralized with sodium hydroxide, sodium carbonate or the like, for example, by washing with an alkaline water solution. Alcohol contained in this layer is then distilled off conveniently at atmospheric pressure.

Unreacted pinene or turpentine and any other hydrocarbons present may then be removed from the mixture of terpineol and terpene ether preferably by distillation at a reduced pressure. The terpineol and terpene ether may then be separated by fractionation preferably at a reduced pressure. However, for some purposes the terpineol and terpene ether need not be separated but may be used as a mixture. Also, in certain cases the products may be used without removal of the unreacted terpene hydrocarbons. Where a mixture of ethers is desired in the product, more than one alcohol may be reacted with the pinene.

The method in accordance with this invention has the utility of providing a means of preparing a new surface active agent which is superior to prior products of similar utility; i. e. natural terpene fractions, in being characterized by a lowered freezing point which is of great value in shipping and handling. It further has only a very mild, slightly flowery odor as compared with the rather strong, irritating, persistent odor of prior products. This product I prepare by reacting pinene or turpentine with a mixture of water and a lower aliphatic alcohol under suitable conditions to obtain a mixture of terpineol and the terpinyl ether of the lower aliphatic alcohol.

The lower aliphatic alcohols which I use in preparing my surface active composition may be methyl alcohol, ethyl alcohol, isopropyl alcohol, etc. Butyl and amyl alcohols may be utilized where the odor of the product is of no consequence. The conditions of reaction will be as hereinbefore described as suitable for the simultaneous preparation of terpineol and a terpinyl ether, adjusting the weight ratio of the lower aliphatic alcohol to water to obtain the particular ratio of terpineol and ether desired in the product. For example, utilizing ethyl alcohol, its ratio to water will be within the range of from about 1:5 to about 1:1 to obtain a mixture of terpinyl ethyl ether and terpineol ranging respectively from about 15% to about 50% of the ether. Upon substantial completion of the reaction, the oily layer containing the product is promptly separated from the aqueous layer and any catalyst associated with the product is neutralized. Any alcohol in the oily layer is then removed by distillation. Unreacted pinene and any other terpene hydrocarbons present may then be removed by fractionation preferably at reduced pressure, although for some uses this step may be omitted.

The product thus obtained comprises essentially a mixture of terpineol and the terpinyl ether of the lower aliphatic alcohol utilized, the terpinyl ether being in quantity ranging from about 15% to about 50% of the mixture. It is characterized by a freezing point below −10° C. It has at most a mild flowery odor when methyl, ethyl and isopropyl alcohols are utilized in preparation. Alternatively, a mixture of terpineol and terpinyl ether is prepared in the manner hereinabove described and terpineol prepared as herein described or as disclosed in my copending application Serial No. 64,169, filed February 26, 1936, is added in such proportion that there results a product comprising a mixture of terpineol and terpinyl ether, preferably terpinyl methyl ether, in which the terpinyl ether is in quantity ranging from about 3% to about 50%, preferably from about 8% to about 30% of the said mixture. In this manner, there are now obtained products having valuable surface active properties and which are, at the same time, characterized by a freezing point below about 0° C. and a very mild flowery odor.

In a broader concept, an improved surface active agent may be produced by adding a terpinyl ether of a lower aliphatic alcohol, or a mixture comprising such an ether, to any terpineol fraction to the extent of about 3% to about 50%, preferably about 8% to about 30% of the resulting composition.

The product is characterized by a freezing point at least 3° C. lower than the composition without the ether. This result is accomplished without impairment of the valuable surface active properties of the terpineol fraction. However, where the freezing point of a natural terpineol fraction is improved in this manner, the normal persistent odor of such fractions still persists. Hence, it is preferable to prepare the improved composition by reaction of pinene with a mixture of water and an alcohol as hereinbefore described.

In addition to the mixture of terpineol and terpinyl ether, my new product may comprise a quantity of terpene hydrocarbons, if desired and convenient. For some uses, for example in flotation of minerals and as an anti-skinning agent in paints, enamels, and varnishes, it is not always essential to eliminate hydrocarbons; and thus unreacted pinene and other terpene hydrocarbons remaining in the reaction product mixture need not in all cases be distilled therefrom.

The improved product of this invention, comprising terpineol and a terpinyl ether, is useful because of its valuable surface active properties. For example, these properties make it useful as a detergent aid and wetting out agent in laundering and textile processing, in kier boiling and wool scouring; in fat-liquoring of leather, in delustering rayon; in flotation of minerals, etc.; in insecticides; in paints, enamels, varnishes, and lacquers, as an anti-skinning agent or evaporation modifier, etc. Its low freezing point and only very mild odor greatly extend its usefulness in these fields as compared with prior products.

The following examples illustrate specific applications of the method of this invention. Throughout this application all parts and percentages are by weight unless otherwise specified.

*Example I*

A mixture of 1,250 grams of water, 1,000 grams ethylene chlorhydrin, and 750 grams of phosphoric acid, the water and acid being added in the form of 37.5% phosphoric acid solution, was agitated with 2,000 grams of turpentine having a pinene content of about 90%, for 16 hours at a temperature of 40 to 45° C. The system was then allowed to separate into two layers, the lower layer was drawn off for use in subsequent production, and the oily layer remaining was neutralized.

The neutralized oily layer was then fractionated into 4 component portions as follows:

|   | Grams |
|---|---|
| 1. Unreacted turpentine | 616 |
| 2. Mono-cyclic terpene hyrocarbons | 342 |
| 3. Terpineol | 888 |
| 4. Terpinyl-beta-chlorethyl ether | 244 |

The terpineol obtained represented a yield of 63.8% on the basis of the turpentine reacted, and since the turpentine had a pinene content of approximately 90%, the yield of terpineol on the basis of the pinene actually reacted is 71%.

The terpinyl-beta-chlorethyl ether obtained represented a yield of 12.2% on the basis of the turpentine reacted which is equivalent to a yield of approximately 20% on the basis of the pinene actually reacted. The combined yield of desired products is thus approximately 91% based on the weight of the pinene which actually reacted.

*Example II*

A mixture of 1,100 grams of water, 1,000 grams of ethylene chlorhydrin, and 400 grams of sodium acid sulphate was agitated with 1,500 grams of turpentine having a pinene content of about 90%, for 6 hours at a temperature of 65 to 70° C. The system was then allowed to separate into two layers, the lower layer was drawn off for use in subsequent production, and the oily layer remaining was neutralized. The neutralized oily layer was then fractionated into five component portions as follows:

|   | Grams |
|---|---|
| 1. Unreacted turpentine | 600 |
| 2. Mono-cyclic terpene hydrocarbons | 120 |
| 3. Terpineol | 555 |
| 4. Terpinyl-beta-chlorethyl ether | 150 |
| 5. Still residue (mostly terpene) | 142 |

The terpineol obtained represented a yield of 61.6% on the basis of the turpentine reacted, and since the turpentine had a pinene content of approximately 90%, the yield of terpineol on the basis of the pinene actually reacted is 68%.

The terpinyl-beta-chlorethyl ether obtained represented a yield of 16.6% on the basis of the turpentine reacted which is equivalent to a yield of approximately 18.5% on the basis of the pinene actually reacted. The combined yield of desired products is thus approximately 87% based on the weight of the pinene which actually reacted.

*Example III*

A mixture of 1,000 grams of water, 800 grams of methanol, and 500 grams of 94% sulphuric acid was agitated with 2,165 grams of turpentine for a period of 12 hours at a temperature of 40° C. ± 3° C. The system was then allowed to separate into two layers and the lower layer drawn off. The oily layer remaining was neutralized with sodium hydroxide. The methanol present was distilled off at atmospheric pressure, and the product remaining was then fractionated in vacuum into four component portions as follows:

|   | Grams |
|---|---|
| 1. Unreacted turpentine | 356 |
| 2. Mono-cyclic terpene hydrocarbons | 356 |
| 3. Mixture of terpineol and terpinyl methyl ether | 1,641 |
| 4. Still residue | 108 |

The mixture of terpineol and terpinyl methyl ether obtained represented a yield of 76% by weight of the turpentine charged. Since the turpentine had a pinene content of approximately 90%, the yield of the said mixture on the basis of the pinene which actually reacted was 89%, by weight.

The mixture of terpineol and terpinyl methyl ether was a product suitable for use as a solvent and surface active agent, or as a source of terpineol and terpinyl methyl ether obtainable by fractionation. This mixture had the following analysis:

| | |
|---|---|
| Specific gravity at 15.5° C | .9291 |
| Refractive index at 20.0° C | 1.4768 |
| Per cent tertiary methyl ethers | 39.0 |
| Per cent tertiary alcohols | 58.0 |
| Boiling range: | |
| 5% | 209.0° C. |
| 20% | 213.2 |
| 50% | 216.0 |
| 70% | 217.5 |
| 90% | 220.0 |
| 95% | 225.5 |
| Freezing point | Below −10°C. |
| Color | Water white |
| Odor | Very mild |

Example IV

A mixture of 1,000 grams of water, 816 grams of ethyl alcohol, and 600 grams of 94% sulphuric acid was agitated with 2,000 grams of turpentine having a pinene content of about 90% for 4½ hours at a temperature of 45 to 50° C. The system was then allowed to separate into two layers and the lower layer was drawn off. The oily layer remaining was neutralized with sodium hydroxide, and the alcohol remaining therein was distilled off atmospheric pressure. The material remaining was then fractionated in vacuum into the following components:

| | c.c. |
|---|---|
| 1. Unreacted turpentine and mono-cyclic terpene hydrocarbons | 810 |
| 2. Mixture of terpineol and terpinyl ethyl ether | 1,050 |
| 3. Still residue | 170 |

The mixture of terpineol and terpinyl ethyl ether represents a product having uses similar to the product obtained in Example III. The analysis of this product was as follows:

| | |
|---|---|
| Specific gravity at 15.5° C | .9326 |
| Refractive index at 20.0° C | 1.4796 |
| Per cent tertiary ethyl ethers | 14.1 |
| Per cent tertiary alcohols | 76.0 |
| Boiling range: | |
| 5% | 215.0° C. |
| 20% | 218.0 |
| 50% | 220.0 |
| 70% | 221.6 |
| 95% | 226.5 |
| Freezing point | Below −10° C. |
| Odor | Very mild |
| Color | Water white |

Example V

A mixture of 250 grams of water, 250 grams of methanol, and 244 grams of crude benzene sulphonic acid was agitated with 1,000 grams of alpha pinene for 11 hours at a temperature of 35 to 40° C. The system was allowed to separate into two layers and the lower layer was drawn off. The oily layer remaining was neutralized, steam distilled, and then fractionated. A hydrocarbon fraction of 79 grams which represents 7.9% of the pinene charged was obtained. A mixture of terpineol and terpinyl methyl ether, weighing 660 grams and representing a yield of 66% on the basis of the pinene charged, was also obtained.

This application is a division of my copending application, Serial No. 297,673, filed October 3, 1939, now Patent No. 2,285,366, dated June 2, 1942.

It will be understood that the details and examples hereinbefore set forth are illustrative only and that the invention as broadly described and claimed is in no way limited thereby.

What I claim and desire to protect by Letters Patent is:

1. A composition of matter, suitable as a surface active agent or solvent, consisting essentially of a mixture of terpineol and a terpinyl aliphatic ether having not more than five carbon atoms in the aliphatic substituent thereof, the ether in quantity between about 3% and about 50% of the said mixture.

2. A composition of matter, suitable as a surface active agent or solvent, consisting essentially of a mixture of terpineol and a terpinyl aliphatic ether having not more than five carbon atoms in the aliphatic substituent thereof, the ether in quantity between about 3% and about 50% of the said mixture characterized by both a freezing point below about 0° C. and at most a mild odor.

3. A composition of matter, suitable as a surface active agent or solvent, consisting essentially of a mixture of terpineol and a terpinyl methyl ether, the ether in quantity between about 3% and about 50% of the said mixture.

4. A composition of matter, suitable as a surface active agent or solvent, consisting essentially of a mixture of terpineol and a terpinyl ethyl ether, the ether in quantity between about 3% and about 50% of the said mixture characterized by both a freezing point below about 0° C. and at most a mild odor.

5. A composition of matter, suitable as a surface active agent or solvent, consisting essentially of a mixture of terpineol and a terpinyl isopropyl ether, the ether in quantity between about 3% and about 50% of the said mixture.

DONALD H. SHEFFIELD.